July 30, 1963
J. E. THRAP ETAL
3,099,284
FLOW DIVIDER VALVE
Filed July 17, 1959
2 Sheets-Sheet 1
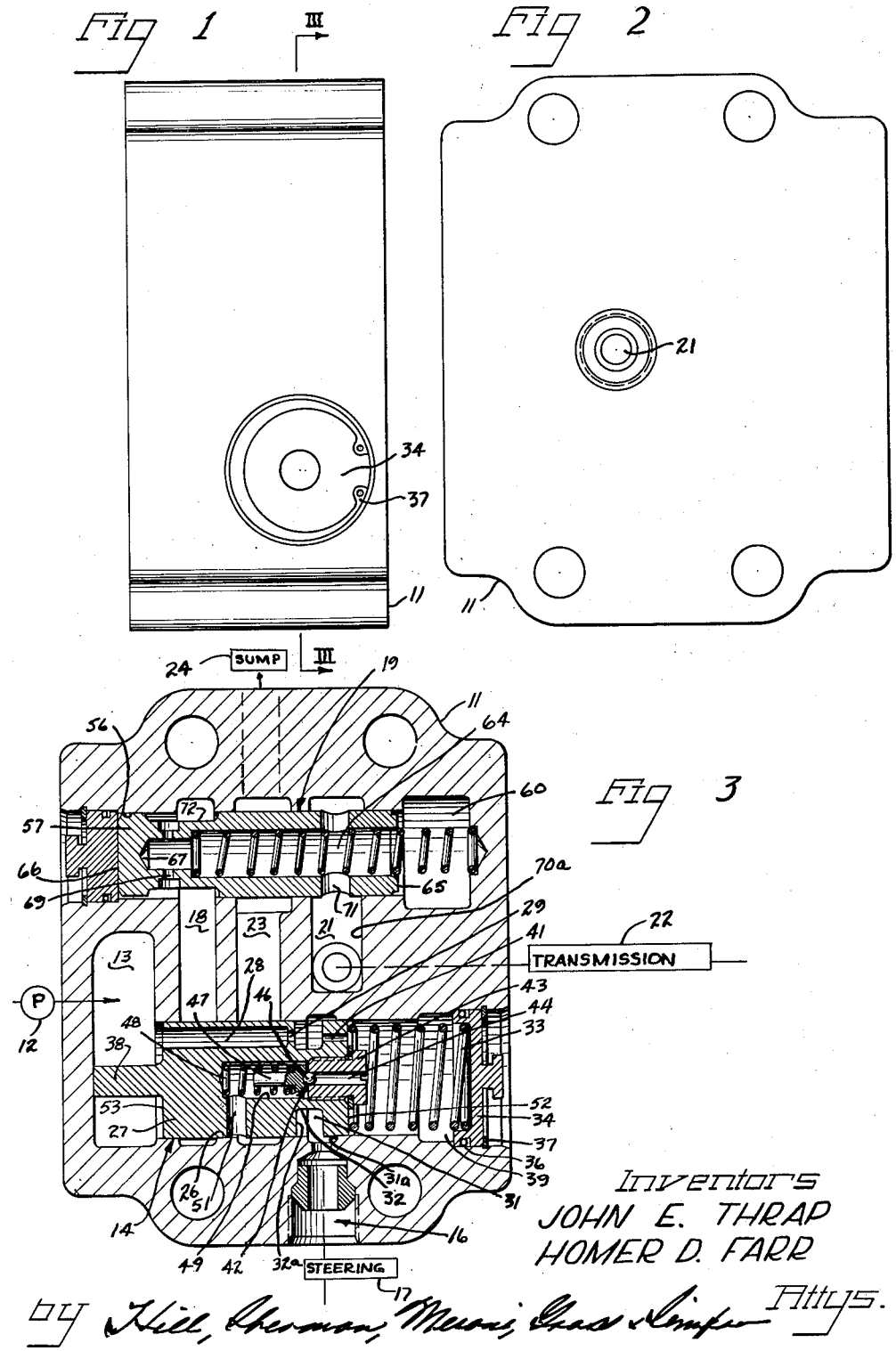
Inventors
JOHN E. THRAP
HOMER D. FARR

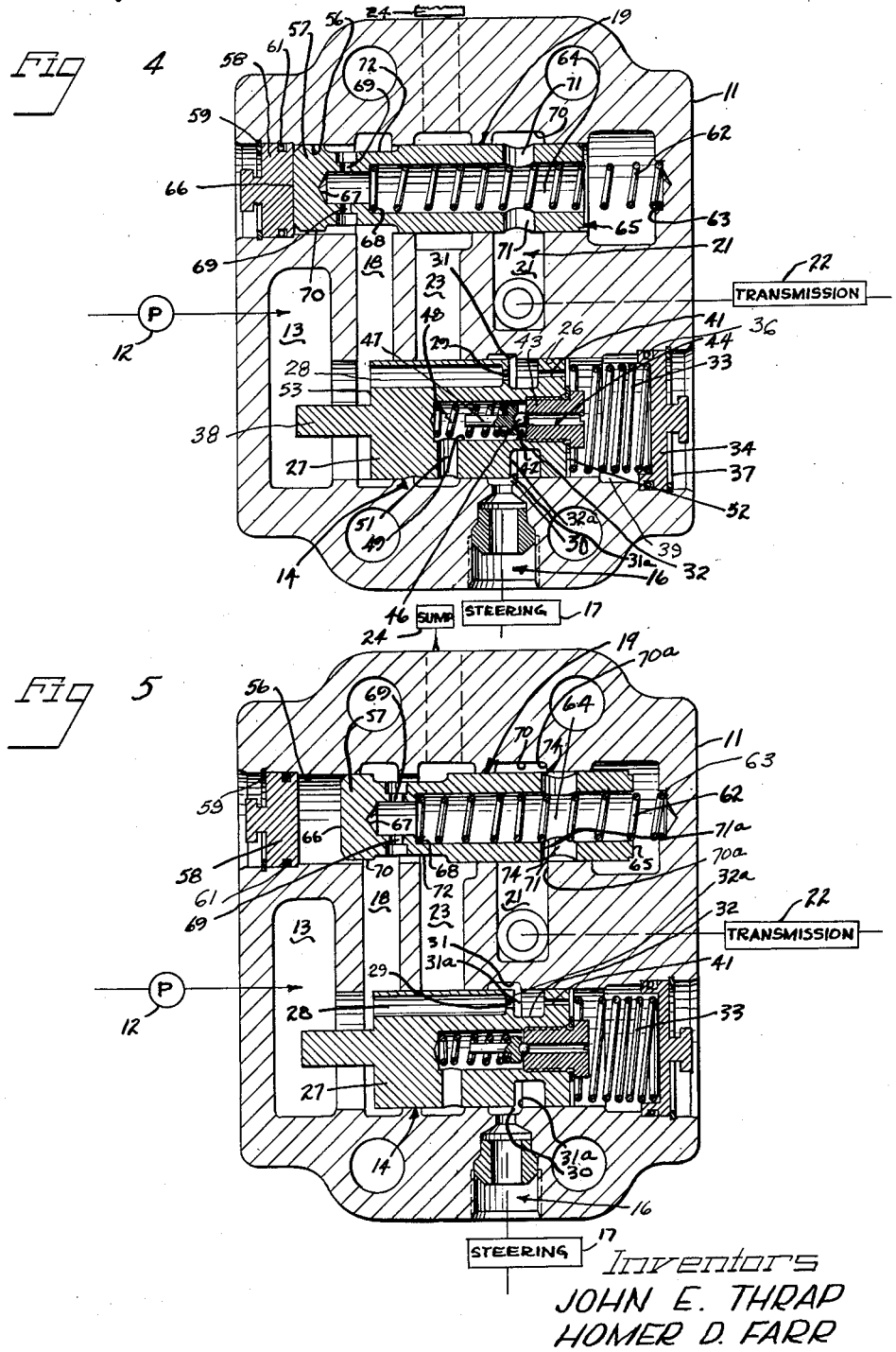

United States Patent Office 3,099,284
Patented July 30, 1963

3,099,284
FLOW DIVIDER VALVE
John E. Thrap, Garfield Heights, and Homer D. Farr, Brecksville, Ohio, assignors to Thompson Ramo Wooldridge Inc., Cleveland, Ohio, a corporation of Ohio
Filed July 17, 1959, Ser. No. 827,947
7 Claims. (Cl. 137—117)

The present invention relates to improvements in flow dividing control valves and particularly to an oil supply system furnished with oil under pressure from a single delivery pump having a varying delivery pressure and provided with a flow divider valve for delivering to separate supply points which may be at different pressures at proper flow rates.

This invention contemplates the provision of a flow divider valve arrangement which is capable of controlling flow to two systems. In automotive vehicles and the like, different systems having fluid operated power accessories are used which require a supply of pressurized oil or other operating fluid. The oil is usually delivered by an engine driven pressure pump which may have a delivery that varies with the speed of the vehicle engine. Power operated steering mechanisms and transmissions are among the accessories requiring a supply of pressurized oil and may have different flow requirements. The present invention contemplates the provision of a supply system embodying a valve which will furnish a pressurized supply of oil to a power steering mechanism and to a power transmission which have different flow requirements.

An improved flow divider valve is provided which will supply the proper flow of oil under pressure to the power steering, at one pressure and at one flow requirement and will supply oil under pressure at another pressure and another flow requirement to a power transmission mechanism, and will accommodate variances in supply pressure and flow and will dump the excess oil to a line returning to a sump.

An object of the present invention is to provide an improved oil supply system embodying an improved flow divider valve capable of operating to control and divide a flow of oil delivered under pressure from a single variable pressure supply to separate demand systems having different pressures and to automatically supply the systems at their necessary flows. Another object is to provide a flow divider valve of the above capabilities wherein the systems require different rates of flow.

Another object of the invention is to provide a flow divider valve for plural systems wherein a self adjusting orifice is obtained to compensate for variances in supply pressures.

Another object of the invention is to provide an improved flow divider valve of simplified and reliable construction for delivering pressure fluid from a single supply to plural points of demand.

A still further object of the invention is to provide improved valve elements for use in a valve system capable of supplying in sequence a first and a second demand and rejecting a delivery in excess of said demands.

Another object is to provide a flow divider valve for supplying different demand systems with individual demand requirements and which will supply said requirements and be indifferent to changes in supply conditions.

Other objects and advantages will become more apparent with the teaching of the principles of the invention as disclosed in the preferred embodiment thereof in the specification, claims and drawings, in which:

FIGURE 1 is a side elevational view of a valve housing having a valve mechanism therein, embodying the principles of the present invention;

FIGURE 2 is a front elevational view of the housing of FIGURE 1;

FIGURE 3 is a vertical sectional view taken substantially along line III—III of FIGURE 1 and showing details of the interior construction of the valve mechanism with no fluid being delivered by the pump;

FIGURE 4 is a vertical sectional view similar to FIGURE 3, but showing the valve mechanism as the power steering supply control valve moves to operative position and before the transmission valve is in full operation; and, FIGURE 5 is a vertical sectional view similar to FIGURES 3 and 4, but illustrating the valve mechanism in full operation supplying the power steering and power transmission.

As shown on the drawings:

*Overall Operation of System*

As embodied in a vehicle such as an automobile, in a preferred arrangement, the features of the invention are illustrated in FIGURES 3, 4 and 5 as including a pump 12 driven by suitable means such as an automobile engine and connected to deliver an operating fluid, such as oil, to the valve mechanism enclosed within a valve housing 11. The pump 12 delivers to a primary supply chamber or pump passage 13, and a first or a steering valve 14 controls the flow from the pump passage 13. Continuous flow is directed to a first or a steering supply passage 16 which connects to a steering mechanism 17. The valve 14 controls the flow from the pump passage 13 to the steering supply passage 16 to allow only a predetermined flow. The pump passage 13 communicates (when the plunger of the valve 14 moves to the right) with a second or a transmission supply passage 18.

A second or a transmission valve 19 controls the flow from the transmission supply passage to a transmission delivery passage 21. The transmission supply passage also communicates with a return passage 23 (when the plunger of the valve 19 moves to the right) which returns the excess oil not used by the steering and transmission devices to a sump 24.

The valve mechanism operates to serve two systems, e.g. the power steering system and the transmission system with variance in supply pressure and to satisfy and regulate flow to each system. As an example, the power steering system might require 2 g.p.m. at 700 p.s.i. and the transmission system might require 4 g.p.m. at 100 p.s.i. when the pump is supplying an adequate amount of oil under pressure, the dividing valve will function so as to adequately supply each system with the proper amount of oil.

*The Steering Valve*

The steering valve 14, FIGURES 3 and 4 includes a valve chamber 26 within the housing 11. The valve chamber is cylindrical in shape, and houses a cylindrically shaped valve plunger 27. The plunger has a flow conduit or chamber 28 therein leading to a pressure drop or controlling orifice 29, which communicates with an annular valve groove 32 formed in the valve plunger and communicating with an annular chamber groove 31 in the valve chamber 26. The chamber groove 31 communicates with the steering supply passage 16. The valve groove 32 is positioned so that flow may continue from the pump passage 13 through the valve plunger 27 to the steering supply passage 16. The valve groove 32 has an annular side valve surface 32a which coacts with an annular side chamber surface 31a of the groove 31 to form an annular variable flow control secondary orifice 30 therebetween, as shown in FIGURES 4 and 5 the variable secondary orifice 30 varies as the valve plunger 27 shifts position. The plunger 27 is shown in FIGURE 3 in a first upstream position when the pump is not operating and there is no pressure upstream of the valve, and is shown in operating position in FIGURES 4 and 5, having moved toward a second or downstream position.

The valve plunger 27 is urged toward the first, or upstream position by a coil compression spring 33 positioned between the plunger 27 and a spring supporting plug 34. The plug is provided with an annular seal 36 and is locked in position by an expanding snap ring 37. Movement of the plunger 27 to first position is limited by a protuberance 38 on the end of the plug, which engages a wall of the pump passage 13. The spring 33 is located in a control pressure chamber 39 at one end of the plunger 27 and the pressure of the oil in the control pressure chamber 39 acts against a plunger first end surface 52 to urge the plunger toward first the upstream position. Oil enters the chamber 39 through a connecting orifice or port 41 in the plunger from the annular valve groove 32 of the plunger so that the pressure in the chamber 39 is the same as in the groove 31.

A relief valve 42 permits the escape of oil from the control chamber 39 at a predetermined maximum pressure, and the relief valve includes a plug 43 having a flow passage 44 therein terminating in a valve seat against which seats a ball relief valve 46 held in place by a ball support 47 backed by a spring 48. The spring 48 and plug 43 are located in a bore 49 extending part way through the valve plunger 27, and oil flows through the bore 49 and out through a lateral bore 51 which communicates with the return passage 23 in the valve housing 11.

The pressures affecting the control position of the valve plunger 27, and therefore the size of the control orifice 30, act on the first end surface 52 exposed to the control chamber 39 to urge the plunger to the first position, and on a second end surface 53 of the plunger exposed to the oil pressure in the pump passage 13 to urge it toward the second position. Flow from the pump passageway 13 through the controlling orifice 29 creates a reduced pressure in the steering passage 16 and hence a pressure differential across the plunger 27.

The controlling orifice 29 and the secondary orifice 30 will operate to allow only a predetermined flow to the steering mechanism 17. When the pump delivery pressure increases to cause an increased pressure in the pump passage 13, the flow through the orifice 29 tries to increase. This causes an increased pressure drop across the orifice and a consequent increased pressure differential acting on the first surface 52 and the second surface 53. Due to this pressure drop, the valve plunger 27 moves downstream toward second position to choke off the flow to the steering system. The valve plunger 27 will automatically assume a position wherein the upstream pressure on the second surface 53 is equal to the force of the downstream pressure in the chamber 39 on the valve plunger surface 52 plus the force of the spring 33. This position of equilibrium will be reached with the correct flow through the orifice 29 and the secondary orifice 30 will pass the same flow to the steering mechanism 17. Thus the valve 14 will automatically compensate for variations in upstream pressure and will continue to supply the steering mechanism with proper flow. The excess fluid will be directed to the transmission supply passage 18 and the second valve 19 will divide the flow to furnish fluid to the transmission mechanism at its proper flow and the excess fluid will be returned to the sump.

The Transmission Valve

The transmission valve 19 includes a substantially cylindrical bore 56 in the housing 11 slidably containing a transmission valve plunger 57. The bore is closed by a plug 58 locked in place by an expanding spring ring 59 and sealed by an annular gasket 61.

The valve plunger 57 has a coil compression spring 62 which seats on a surface 63 in a control chamber 60 at one end of the cylindrical bore 56. The spring extends up into a flow chamber 64 bored into one end of the valve plunger and seats against a shoulder 68 in the flow chamber. The shoulder 68, with an annular end surface 65, and a surface 67 at the base of the flow chamber, constitutes a first or downstream surface which is exposed to the pressure of the oil in the control chamber 60 and flow chamber 64 to coact with the spring 62 to urge the valve toward a first or upstream position in which the plunger 57 is positioned in FIGURE 4, prior to its moving to its operative position in FIGURE 5. The valve plunger has at the other end a second or upstream surface 66 which is exposed to the pressure of the oil in the transmission passage 18 to urge the plunger toward a second or downstream position, as illustrated in FIGURE 5. The plunger 57 is cut away at 70 to permit the oil to have access to the second surface 66. A pressure differential exists across said first and said second surfaces of the plunger by virtue of pressure drop or controlling orifices 69 extending radially through the plunger and communicating between the flow chamber 64 within the plunger and the transmission passage 18. Oil flows out of the flow chamber through radial ports 71 in the plunger into the transmission delivery passage 21. The radial ports open into a groove 70 having a side surface 70a which coacts with the front edges or surface 71a of the ports 71 to form variable secondary orifices 74, as shown in FIGURE 5.

The flow required by the transmission mechanism is satisfied by design of the size of the pressure drop orifices 69 and the size of the spring 62. These characteristics will of course differ from the characteristics of the orifice 29, and the spring 33 of the steering valve, if the requirements differ, as will be appreciated by those skilled in the art.

When the pump is supplying an adequate amount of oil under pressure for the steering mechanism and for the transmission, so that the steering valve plunger 27 moves to the operative position as shown in FIGURES 4 and 5, the plunger 57 of the transmission valve will move to the operative position as illustrated in FIGURE 5. In this position the transmission mechanism 22 will be supplied oil at the required pressure and the excess oil will be directed from the transmission supply passage to the return passage 23 via a reduced portion 72 in the valve plunger.

The plunger will maintain a position to supply oil to the transmission at the correct flow and when the upstream pressure increases due to increase in pump output, the flow through the controlling orifices 69 tries to increase. This causes an increased pressure drop across the orifices 69. Due to this pressure drop, the pressure differential across the plunger 57 increases to move the plunger downstream toward the second position so as to choke off the flow to the transmission delivery passage 21 by the closing of the variable orifice 74. When the pressures acting in opposition on the plunger 57 reach equilibrium, flow will be supplied to the transmission delivery passage 21 at the proper rate independent of the variance in the upstream pressure.

As a summary of overall operation, oil is supplied to the valve assembly from the pump 12 to the pump passage 13 and will flow through the control orifice 29 of the steering valve plunger 27, and the pressure differential across the valve plunger will vary the size of the secondary orifice 30 and flow through orifices 29 and 30 will remain constant and oil will be delivered at the proper flow rate to the steering mechanism 17. Oil flows to the transmission mechanism through the transmission supply passage 18 and through the control orifices 69 in the transmission valve plunger 57. The pressure differential across the orifices 69 moves the valve plunger 57 to vary the size of the secondary control orifice 74 and flow through orifices 69 and 74 will remain constant to supply oil to the transmission delivery passage 21 at the proper flow rate. The excess oil flows through the groove 72 in the transmission valve plunger 57 to the passage 23 back to the sump. The pump 12 may be connected to the sump for a closed system.

Thus, it will be seen that we have provided an improved oil supply system and flow divider valve which meets the objectives and advantages hereinabove set forth. The mechanism provides an improved reliable and simplified valve construction for handling the output of a single variable delivery pump and supplying the needs of a steering mechanism and a transmission.

The drawings and specification present a detailed disclosure of the preferred embodiments of the invention, and it is to be understood that the invention is not limited to the specific forms disclosed, but covers all modifications, changes and alternative constructions and method falling within the scope of the principles taught by the invention.

We claim as our invention:

1. A flow divider valve comprising in combination a primary supply passage for supplying pressurized fluid, a first valve connected to the primary passage and movable between a first position and a second position, a first passage connected to the first valve and communicating with said primary passage in the first and second positions of the first valve, a second passage connected to the first valve and communicating with said supply passage only in the second position of said first valve, means connected to said first valve for controlling the position thereof and moving the valve toward said second position when an adequate fluid is delivered to said first passage, a second valve movable between a first position and a second position and connected to said second passage, a delivery passage leading from said second valve and communicating with said second passage in both of said first and second positions of the second valve, a pressure drop orifice between said second passage and said delivery passage, a return passage connected to said valve communicating with said second passage in positions other than said first position of said valve, said second valve having a variable control orifice between said delivery passage and said second passage, and means responsive to pressure drop across said pressure drop orifice and connected to control said second valve and the size of said variable orifice.

2. A valve mechanism for use in a fluid supply system having a variable supply for providing pressurized fluid for operating a power steering mechanism and supplying a transmission, the valve mechanism comprising in combination a pump passage for receiving pressurized fluid from a pump, a steering valve with a variable orifice connected to the pump passage and movable between a first position and a second position, a steering supply passage connected to the valve and communicating with said pump passage through said orifice in first and second position of the valve, a transmission supply passage connected to the valve and communicating with said pump passage in positions other than said first position of said valve, means connected to said valve for controlling the position thereof to control the delivery of fluid to said steering supply passage, a transmission delivery passage for supplying fluid to a transmission, a return passage for returning an excess of fluid to a sump, a pressure drop orifice connected between said transmission supply passage and said transmission delivery passage, and a transmission valve including a valve chamber and a valve plunger slidable therein between a first and a second position with a second variable orifice communicating between said transmission supply passage and said transmission delivery passage, a first operating surface on said valve plunger exposed to pressure downstream of said pressure drop orifice and urging said valve plunger to said first position, a second operating surface on said valve plunger exposed to pressure upstream of said pressure drop orifice and urging said valve plunger to second position, said transmission supply passage and said transmission delivery passage being in communication in said first position and said second position of said valve plunger through said second variable orifice, and said transmission supply passage being in communication with said return passage in positions other than first position of said valve plunger.

3. A valve mechanism for use in a fluid supply system having a variable supply for providing pressurized fluid for operating a variable demand power steering mechanism and supplying a transmission, the valve mechanism comprising in combination a flow control housing having therein a pump passage for re-pressurized fluid from a pump, a steering valve having a variable orifice connected to the pump passage and movable between a first position and a second position, a steering supply passage connected to the valve and communicating with said pump passage through said orifice in first and second positions of the valve, a transmission supply passage connected to the valve and communicating with said pump passage in positions other than the first position of said valve, means connected to said valve for controlling the position thereof to control flow to said steering supply passage and to deliver excess fluid to said transmission supply passage, a transmission delivery passage for delivering fluid to a transmission, a return passage for the return of excess fluid to a sump, and a transmission valve including a valve chamber with a valve plunger slidable therein between a first and a second position, a flow chamber within said valve plunger, a pressure drop orifice through said plunger communicating with said flow chamber, a first operating surface on said valve plunger exposed to pressure downstream of said pressure drop orifice and urging said plunger to first position, a second operating surface on said valve plunger exposed to the pressure upstream of said pressure drop orifice and urging said plunger to second position, biasing means urging said plunger to first position, said transmission supply passage and said transmission delivery passage being in communication through said flow chamber in said first and second positions of said plunger, and said transmission supply passage and said return passage being in communication in said second position of said plunger, and a second variable orifice controlled by the position of said second valve connected between said transmission delivery passage and said valve flow chamber.

4. A valve mechanism for a fluid supply system having a variable supply for providing pressurized fluid for operating a variable demand power steering mechanism and supplying a transmission comprising in combination a pump passage for receiving pressurized fluid from a pump, a steering supply passage, a transmission supply passage connected to said pump passage, a steering valve means interposed between the pump passage and the steering supply passage and between the transmission supply passage and pump passage, control means connected to said valve means and controlling the valve to deliver flow to said steering supply passage at a predetermined flow independent of pressure change in said pump passage and to deliver the remainder of flow from the pump passage to the transmission supply passage, a transmission delivery passage, a return passage communicating with said transmission supply passage for returning excess fluid to a sump, a transmission valve means interposed between said transmission delivery passage and said transmission supply passage and between said transmission supply passage and said return passage, and means connected to said transmission valve means and controlling the transmission valve means to deliver fluid to said transmission delivery passage at a constant flow rate independent of pressure change in said pump passage and to deliver excess fluid to said return passage.

5. A valve mechanism for a fluid supply system having a variable supply for providing pressurized fluid for operating a power steering mechanism and supplying a transmission comprising in combination a valve housing having a pump passage for receiving pressurized fluid from a pump, a steering supply passage for connection to supply a steering mechanism, a transmission supply passage connected to said pump passage, a first pressure drop orifice connecting said pump passage to said steering supply passage, a variable steering valve means interposed between said pump passage and said steering supply passage downstream of said first pressure drop orifice and between said pump passage and said transmission supply passage, means responsive to the pressure drop across said first orifice connected to said valve means and controlling said valve means to deliver a constant flow to the steering supply passage and the excess to the transmission supply passage, a transmission delivery passage connected to said transmission supply passage, a return passage connected for returning an excess of fluid delivered from the pump passage to a sump, a second pressure drop orifice connecting between said transmission supply passage and said transmission delivery passage, a variable transmission valve means interposed between said transmission supply passage and said transmission delivery passage downstream of said pressure drop orifice and between said return passage and said transmission supply passage, and means responsive to pressure drop across said second orifice and connected to said transmission valve means to control said transmission valve means to define a constant flow to the transmission delivery passage and deliver the excess to said return passage.

6. A flow divider valve comprising a primary chamber for receiving a supply of pressurized fluid, a first passage, a second passage communicating with said primary chamber, a pressure drop orifice connecting said primary chamber to said first passage, a first variable valve means interposed between said pressure drop orifice and said first and second passages, means responsive to the pressure drop across said orifice connected to said first valve means and controlling the position of said valve means to deliver fluid at a predetermined flow rate to the first passage and deliver the remainder to the second passage, a delivery passage connected to said second passage, a return passage for excess fluid communicating with said second passage, a second pressure drop orifice connected between said second passage and said delivery passage, a second valve means interposed between said second pressure drop orifice and said return passage and between said second passage and said return passage, and means responsive to pressure drop across said second orifice and connected to said second valve means to control the position of said second valve means for a predetermined flow rate to said delivery passage and the remainder being delivered to said return passage.

7. A flow divider valve comprising a primary chamber for pressurized fluid, a first passage, a second passage, a third passage, a return passage for excess fluid, a first variable flow control valve interposed between said primary chamber, said first passage, said second passage and said return passage constructed and arranged to deliver fluid to said first passage at a predetermined first flow rate independent of pressure change in said primary chamber and so that only excess fluid flows to said second passage, a second valve interposed between said second passage, said third passage and said return passage constructed and arranged to deliver fluid at a predetermined second flow rate to said third passage independent of pressure change in said primary chamber, and so that said return passage receives excess fluid not received by said third passage, and said return passage also arranged to receive only the excess fluid not received by said second valve.

References Cited in the file of this patent
UNITED STATES PATENTS

| | | |
|---|---|---|
| 2,445,544 | Trautman | July 20, 1948 |
| 2,462,983 | MacDuff | Mar. 1, 1949 |
| 2,661,757 | Lines | Dec. 8, 1953 |
| 2,737,196 | Eames | Mar. 6, 1956 |
| 2,845,086 | Waterman | July 29, 1958 |
| 2,845,939 | Bayer | Aug. 5, 1958 |
| 2,859,762 | Banker | Nov. 11, 1958 |
| 2,963,082 | Binford | Dec. 6, 1960 |

FOREIGN PATENTS

| | | |
|---|---|---|
| 589,095 | Great Britain | June 11, 1947 |